United States Patent [19]

Matsunaga

[11] Patent Number: 5,755,504
[45] Date of Patent: May 26, 1998

[54] SCREEN DEVICE FOR USE WITH IMAGE PROJECTING APPARATUS

[75] Inventor: Tsuyoshi Matsunaga, Tokorozawa, Japan

[73] Assignee: Casio Computer Co., Ltd., Tokyo, Japan

[21] Appl. No.: 501,534

[22] Filed: Jul. 12, 1995

[30] Foreign Application Priority Data

Jul. 18, 1994 [JP] Japan .................................. 6-188773
[51] Int. Cl.$^6$ ........................................................ G03B 21/14
[52] U.S. Cl. ........................................... 353/122; 359/443
[58] Field of Search ..................... 353/79, 122; 359/443, 359/450, 460, 142, 146, 143

[56] References Cited

U.S. PATENT DOCUMENTS 4,941,036  7/1990  Itoh ........................................... 359/146
5,349,460  9/1994  Ogasahara et al. ....................... 359/142

FOREIGN PATENT DOCUMENTS 93011615  6/1993  WIPO .................................. 359/142

Primary Examiner—William Dowling
Attorney, Agent, or Firm—Frishauf, Holtz, Goodman, Langer & Chick

[57] ABSTRACT

A screen device include a screen unit, onto which an image is projected and an infrared ray transmitting unit provided in the vicinity of the screen unit, for allowing infrared rays to pass therethrough. Since the infrared rays are allowed to pass through the infrared ray transmitting unit, the infrared rays emitted from a remote controller are guided from one side of the screen unit to other side thereof. Therefore, even though an apparatus to be controlled by the remote controller is installed behind the screen unit, the apparatus can be controlled by means of infrared rays emitted from the remote controller.

14 Claims, 7 Drawing Sheets

SCREEN DEVICE FOR USE WITH IMAGE PROJECTING APPARATUS

BACKGROUND OF THE INVENTION

1. Field of the Invention

The present invention relates to a screen device for use with an image projecting apparatus.

2. Description of the Prior Art

Liquid crystal projectors are widely used as an image projector for projecting a television image or a video image onto a screen, which projectors receive an image signal from a television receiver or a video tape recorder, display an image on a liquid crystal display, and enlarge and project the displayed image onto a screen.

There are two types of image projectors which are provided with a liquid crystal display for displaying an image thereon, and projects the displayed image onto the screen: one (a liquid crystal projector 4 shown in FIG. 6) is installed at the same side as a watcher P of a screen device 21 to project an image onto a screen 22; and other one (the liquid crystal projector 4 shown in FIG. 7) is installed at a rear side of a screen device 23 to project an image onto a screen 24. The former liquid crystal projector 4 installed at the same side as the watcher P projects an image onto the screen 22, and the watch P watches the image reflected from the screen 22. Therefore, a material that does not allow rays to transmit therethrough is used for the screen 22. Meanwhile, in the latter case, the liquid crystal projector 4 is installed at the rear side of the screen device 23 and the watcher P watches rays transmitting through the screen 24 and, therefore, a material that allows rays to transmit therethrough is used for the screen 24.

When an image generating apparatus such as the video tape recorder 2 is installed at the rear side of the screen 21 or 23, as viewed from the watcher P, as shown in FIGS. 6 and 7, the image generating apparatus can not be controlled with an infrared ray remote controller 5, because the infrared rays emitted from the remote controller 5 are prevented by the screen 22 or 24 of conventional screen device 21 or 23 to reach such image generating apparatus.

In particular, when the reflection type screen 22 is used as shown in FIG. 6, operation of the VTR 2 can not be controlled by the infrared ray remote controller 5 because the reflection type screen 2 of FIG. 6 hardly allows infrared rays emitted from the controller 5 to transmit therethrough. Sometimes the transmission type screen 24 is used as shown in FIG. 7, but some transmission type screen 24 is provided with a light shielding portion 24b for a portion other than a portion 24a of the screen 24, onto which an image is projected, which light shielding portion 24b is made of a member that shields or attenuate light entered therein. Therefore, operation of the image generating device that is installed behind the screen 24 can not be controlled by an infrared ray remote controller 5 because the transmission type screen 22 with the above structure hardly allows infrared rays emitted from the controller 5 to transmit therethrough.

SUMMARY OF THE INVENTION

The present invention has been made to overcome the above mentioned drawbacks, and has an object to provide a screen device for use with an image projecting apparatus, which screen device guides infrared rays of a remote controller from one side of the screen device to other side to control operation of an image generating apparatus such as a television receiver or a video tape recorder which is installed behind the screen device.

According to one aspect of the present invention, there is provided a screen device which comprises a screen unit onto which an image is projected from the image projection apparatus and an infrared ray transmitting unit provided in the vicinity of the screen unit, the infrared ray transmitting unit being made of a member through which infrared rays pass but visible rays are hard to pass.

According to another aspect of the invention, there is provided a screen device which comprises a screen unit onto which an image is projected from the image projection apparatus and a light guiding member provided in the vicinity of the screen unit, which member guides infrared rays entered therein from one side of the screen unit to other side of the screen unit.

According to still another aspect of the invention, there is provided a screen device which comprises a frame, a screen unit supported by the frame, onto which an image is projected from the image projection apparatus, and a light shielding member supported by the frame, and formed with through holes of a small diameter for guiding infrared rays from one side of the screen unit to other side of the screen unit.

According to yet another aspect of the invention, there is provided a system which comprises an image projecting apparatus, a screen device onto which an image is projected from the image projecting apparatus, a device which is provided with an infrared ray receiving unit, the device being installed at a rear side of the screen device, an infrared ray remote controller, and a light guiding member supported by the frame, and formed with through holes of small diameters for guiding infrared rays from one side of the screen unit to other side of the screen unit.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which.

DETAILED DESCRIPTION OF PREFERRED EMBODIMENTS

Now, preferred embodiments of the present invention will be described in detail with reference to FIGS. 1–5.

Figure 1:
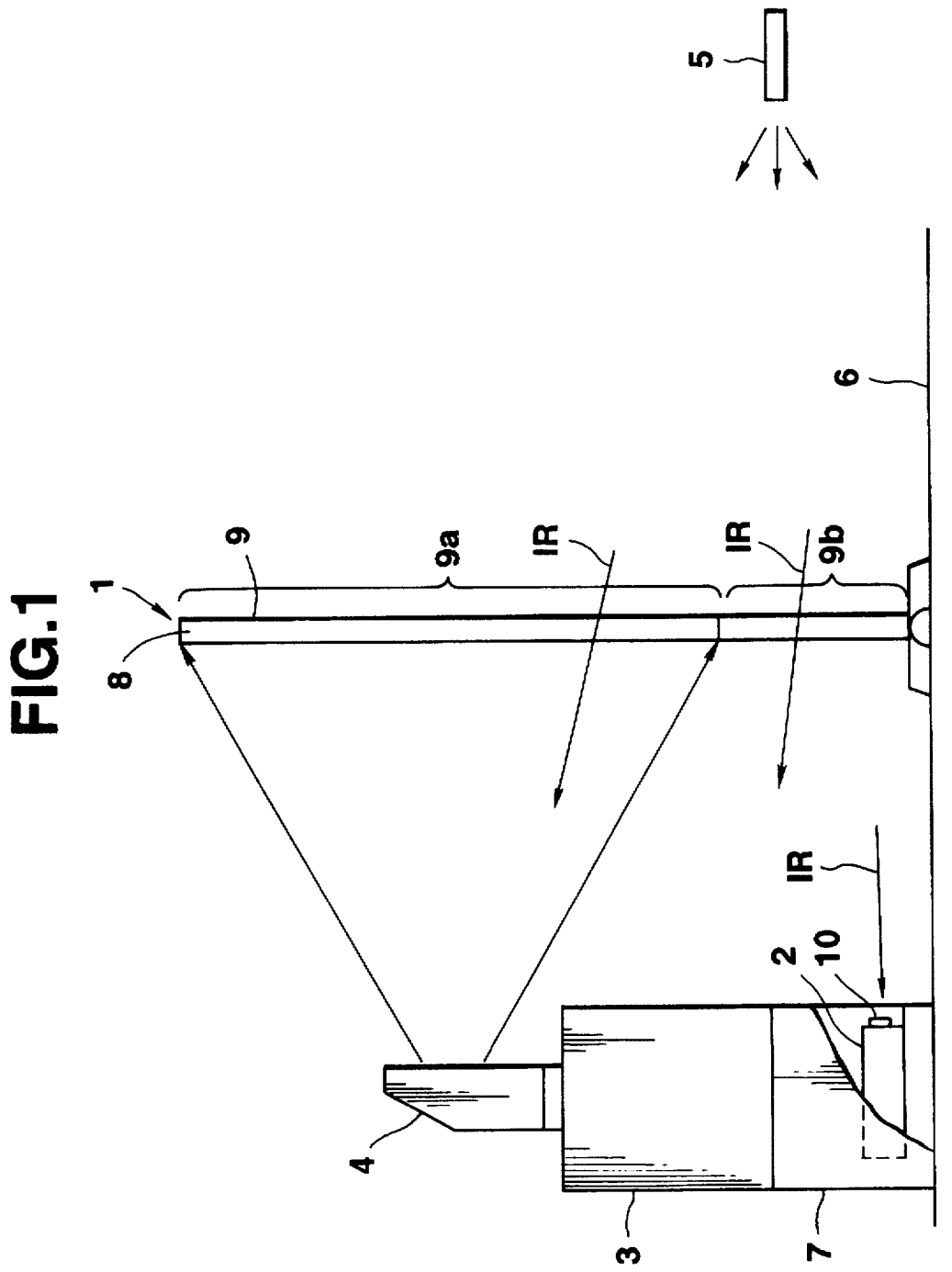
FIG. 1 is a view schematically showing a first embodiment of a screen apparatus of the present invention in use.
Figure 7:
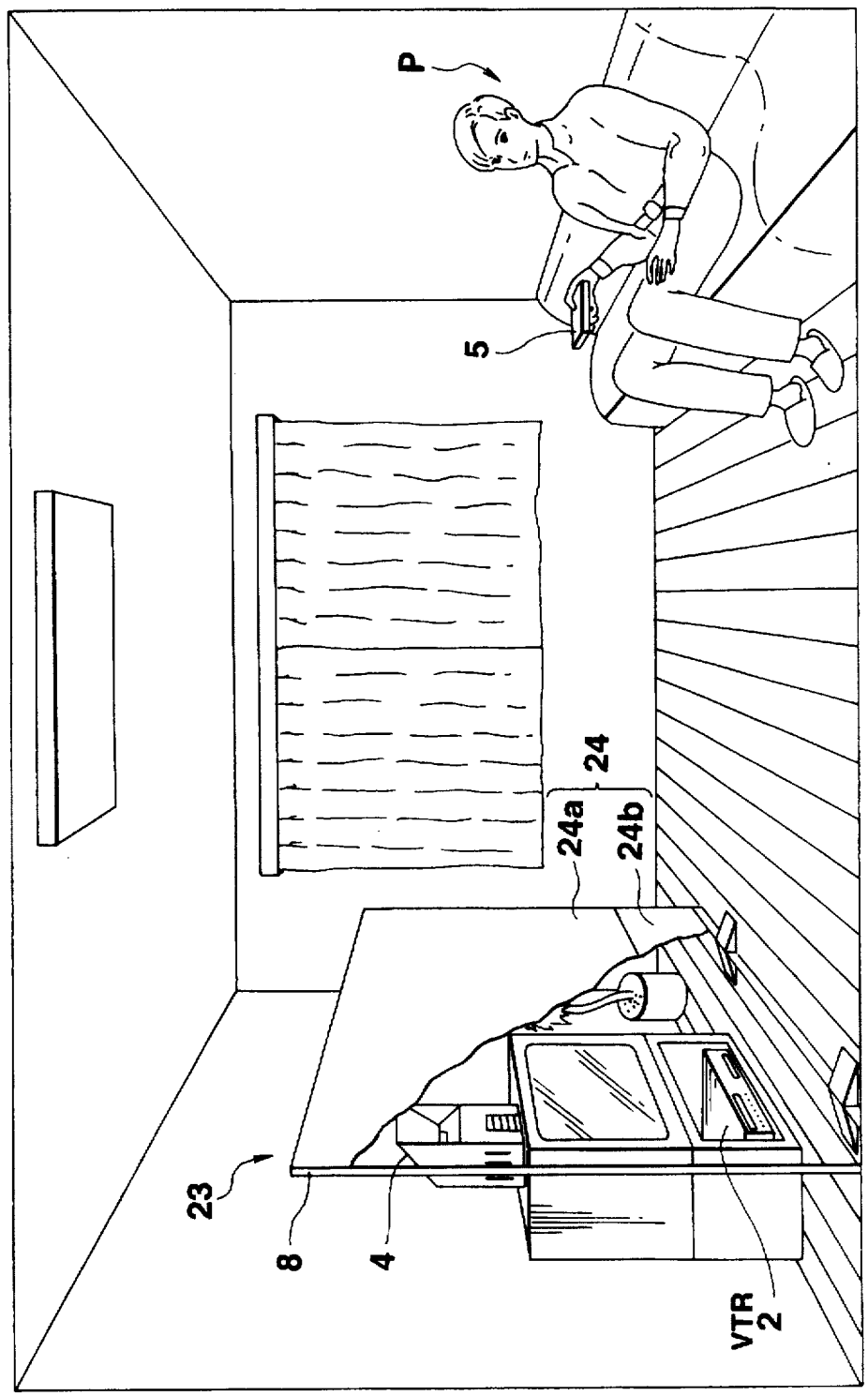
FIG. 7 is a partial broken away perspective view of a transmission type screen device in use.

A first embodiment of the screen device of the invention will be described referring to FIGS. 1 and 2. FIG. 1 is a view showing, by way of example, a general idea of usage of a transmission type screen device to which the present invention is applied. The use of the transmission type screen device of FIG. 1 corresponds to use of the apparatus shown in FIG. 7.

In FIG. 1, a reference numeral 1 denotes the screen device of the present invention, 2 stands for a video tape recorder (VTR) which is used as an image generating apparatus, 3 is a television receiver, 4 is a projecting apparatus as a liquid crystal projector, and 5 is an infrared ray remote controller for remotely controlling the VTR 2.

The screen device 1 is positioned on a floor 6 between the television receiver 3 and a watcher or a user. The television receiver 3 is set on a television receiver rack 7, and the VTR 2 is received therein. Further, the liquid crystal projector 4 is put on the television receiver 3.

The screen device 1 comprises a rectangular frame 8 perpendicularly installed on the floor 6 and a screen 9 expanded thereover. An image projection area 9a of the screen 9 is made of a light transmitting member. An area other than the image projection area 9a on the screen 9 is a blackout area 9b made of a member that shields visible rays and allows infrared rays to pass through. The blackout area 9b is provided to prevent rays, which are emitted from the liquid crystal projector 4 installed behind the screen 9, from coming through the area other than the image projection area 9a. In general, the blackout area 9b is provided at lower side of the image projection area 9a, as shown in FIG. 1.

Figure 2:
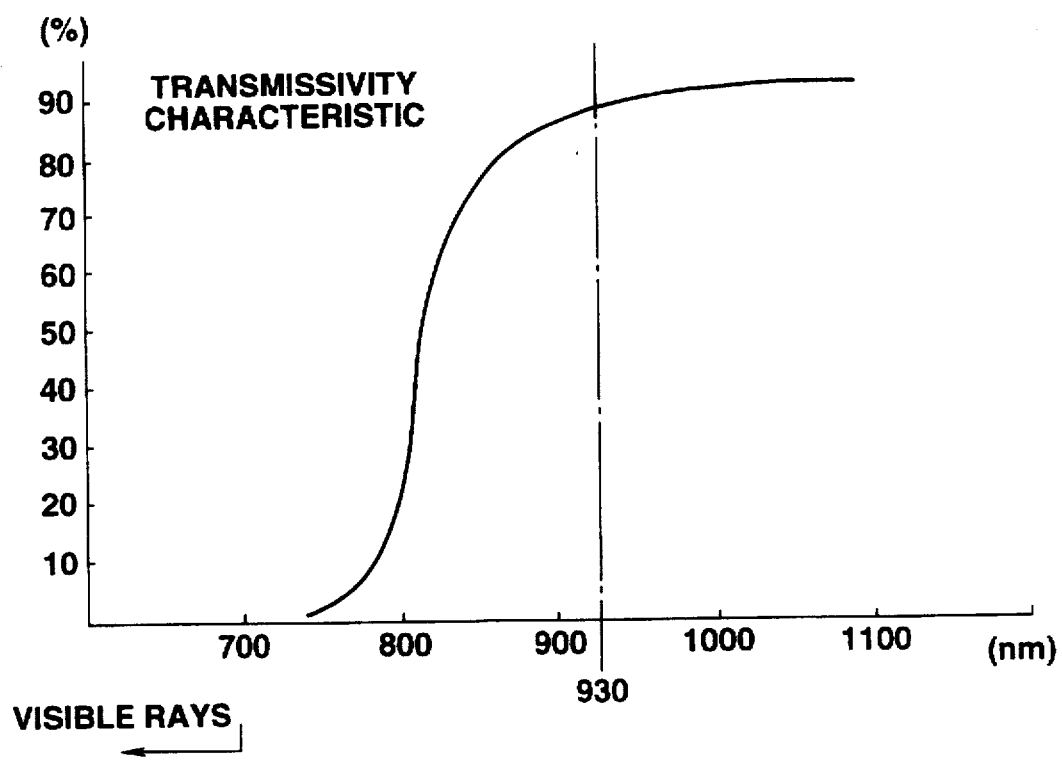
FIG. 2 is a graph showing transmissivity of a member used for a blackout area on a screen shown in FIG. 1.

FIG. 2 is a graph showing a characteristic curve of transmissivity of the member of the blackout area 9b. The characteristic curve exhibits the transmissivity of the member that hardly allows rays of less than 700 nanometers (nm) including visible rays of a wave length range (400–700 nm) to transmit through and allows rays of not less than 800 nm including infrared rays of a wave length range (800–1000 nm) emitted from the remote controller 4 to transmit well. The use of the member having the above transmissivity characteristic for the blackout area 9b prevents rays emitted from the liquid crystal projector 4 from being coming through the blackout area 9b, but allows infrared rays emitted from the remote controller 5 to transmit through the blackout area 9b to a light receiving unit 10 of the VTR 2. A member employed to cover an infrared ray sending/receiving unit of the remote controller 5 may be used as the member for the blackout area 9b.

Therefore, in the first embodiment of the screen device 1, even if installed behind the blackout area 9b of the screen 9, the VTR 2 or the image generating apparatus may be remotely controlled by the infrared ray remote controller 5 without any trouble. A sheet of a synthetic resin such as, for example, an acrylic resin, a surface of which is coated with a paint having a wavelength selecting characteristic, which paint is used for an optical filter, may be used as the member of the blackout area 9b of the screen 9 in the first embodiment of the screen device 1.

Figure 6:
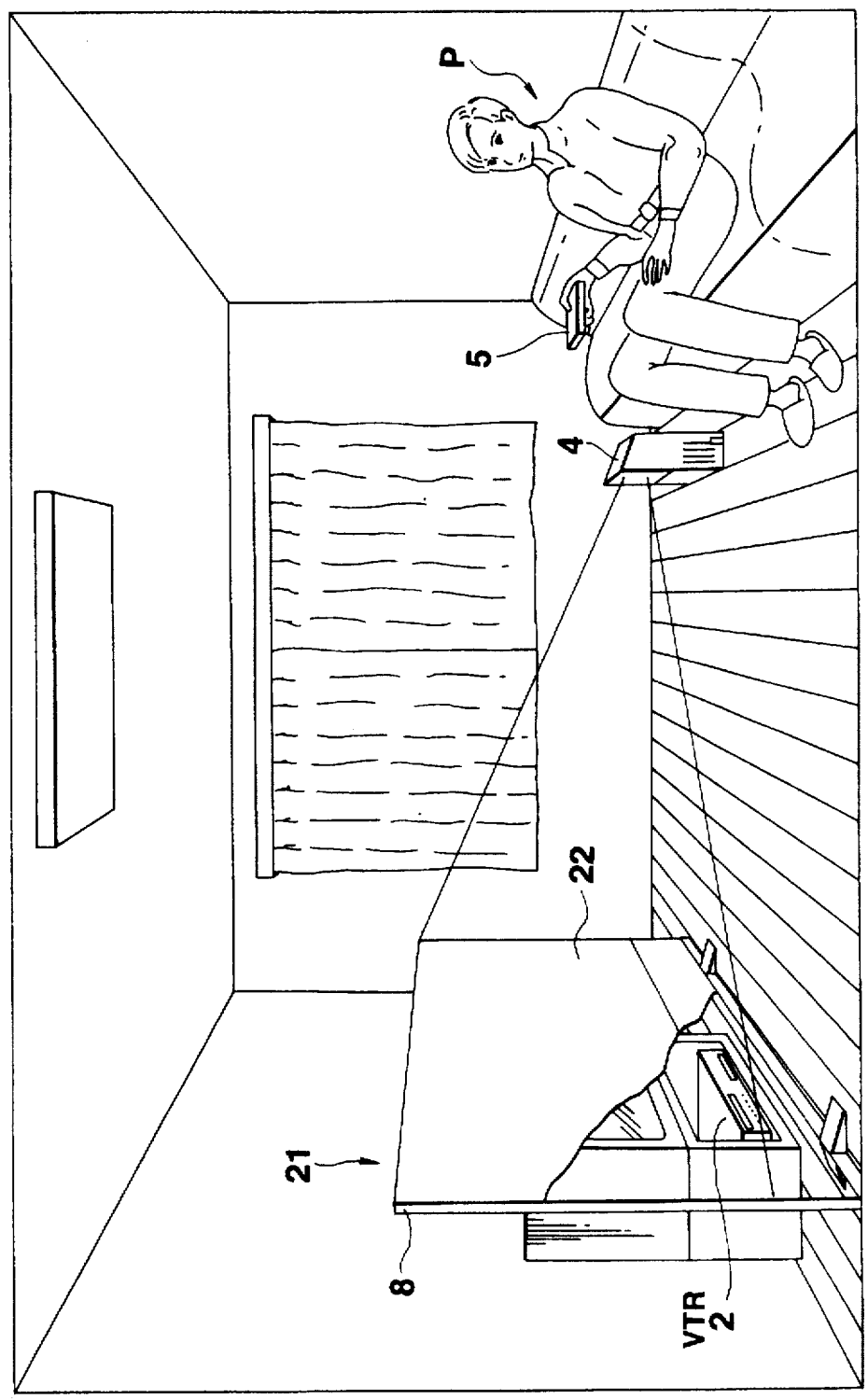
FIG. 6 is a partial broken away perspective view of a reflection type screen device in use.

In the first embodiment of the screen device 1, the transmission type screen device, to which the present invention is applied, has been described. The present invention may be applied to a reflection type screen device, in which an image is projected on a reflection type screen from the same side of a watcher and a user P watches an image reflected on the reflection type screen, as shown in FIG. 6. In this case, the whole of the screen 9 may be made of a member having the transmissivity shown in FIG. 2.

Figure 3:
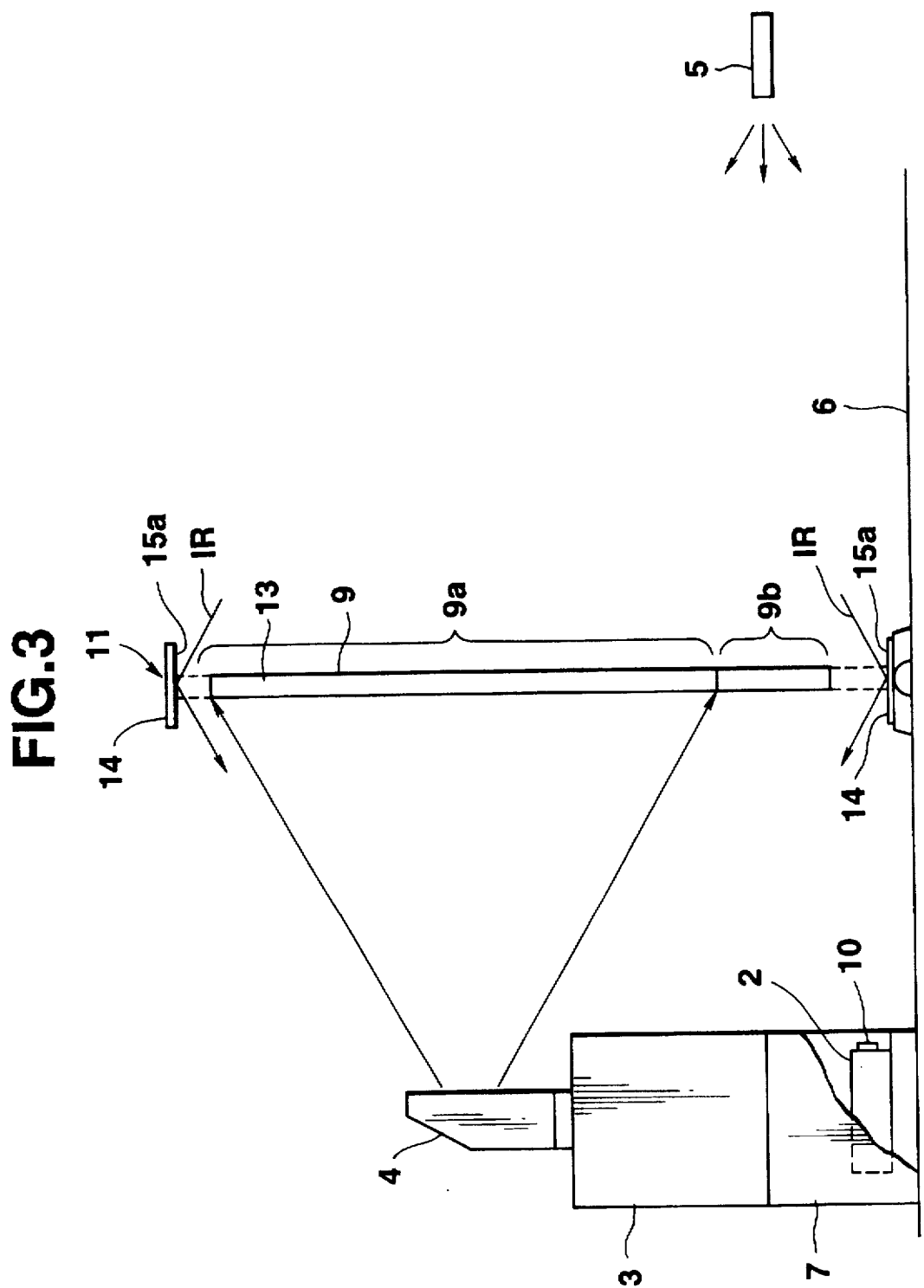
FIG. 3 is a view schematically showing a second embodiment of the screen device of the present invention in use.
Figure 4:
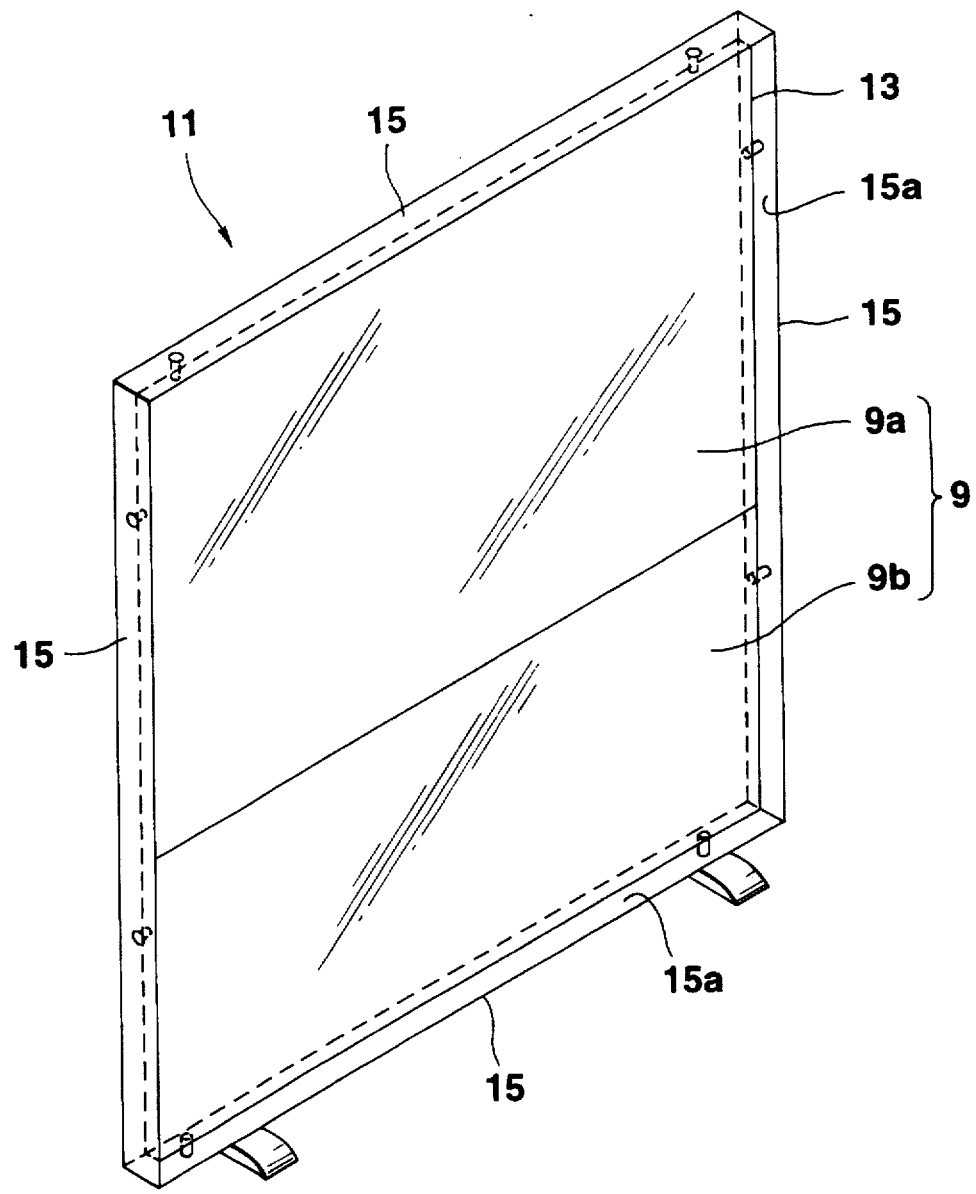
FIG. 4 is a perspective view of the screen device of FIG. 3.

Now, a second embodiment of the screen device of the present invention will be described referring to FIGS. 3 and 4. In FIGS. 2 and 3, like elements as those in FIG. 1 are designated by like reference numerals, and their description will be omitted there.

The screen device 11 according to the second embodiment of the invention, comprises a rectangular frame 13 for supporting the screen 9 and a reflection member 14 provided around the frame 13. The reflection member 14 is for guiding infrared rays from one side of the screen to other side thereof. A member, through which infrared rays hardly transmit, is used for the blackout area 9b of the screen.

The reflection member 14 comprises a metal stripe 15 attached to the frame 13 so as to surround the frame 13. The metal stripe 15 is fixed to and kept apart from the frame 13 by a predetermined distance by means of supporting members 16. A surface 15a of the metal stripe 15 facing the frame 13 is subjected to a mirror finishing process so that infrared rays emitted from the remote controller 5 operated by the user P are reflected to other side of the screen 9.

In the screen device 11 according to the second embodiment of the invention, even though the VTR 2 or the image generating apparatus is installed at other side of the blackout area 9b of the screen 9, infrared rays IR emitted from the remote controller 5 are reflected on the reflection member 14 and allowed to reach the image generating apparatus. Accordingly, the image generating apparatus can be remotely controlled by the infrared ray remote controller 5 without any trouble.

The reflection member 14 of the second embodiment may be employed, without any modification thereto, to the reflection type screen device.

In the second embodiment, the reflection member 14 comprises a metal strip 15 surrounding the frame 13 of the screen 9, but the reflection member 14 may comprise one and more metal plates supported in the vicinity of the frame 13 of the screen 9. Further, the reflection member 14 may comprise a prism.

Figure 5A:
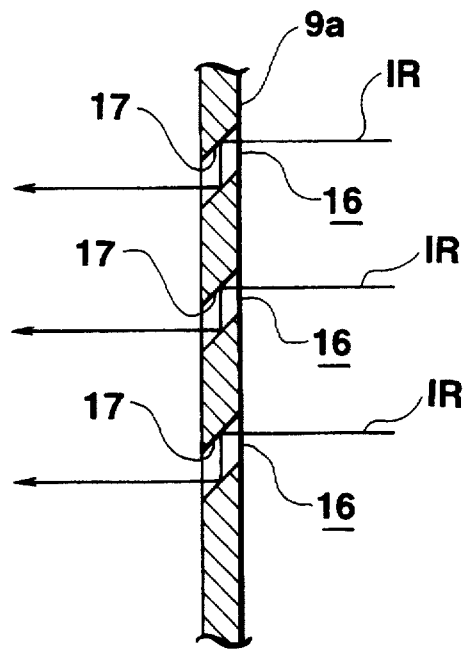
FIG. 5A is a partial cross-sectional view of a reflection member used in the second embodiment.
Figure 5B:
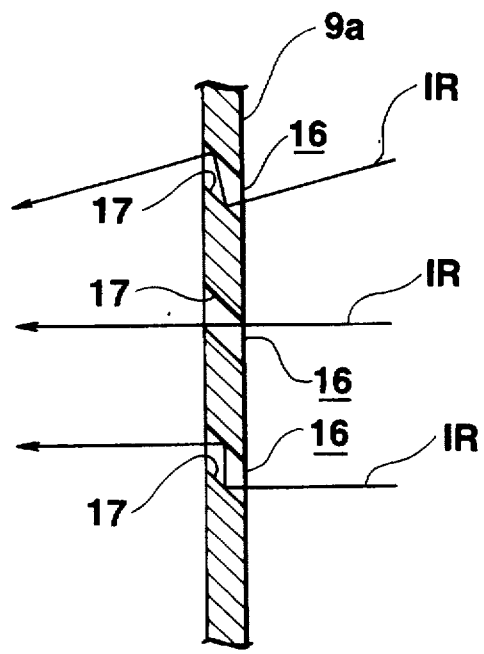
FIG. 5B is a partial cross-sectional view of another reflection member used in the second embodiment.

Further, as shown in FIGS. 5A and 5B, the blackout area of the screen may be used, in which through holes 16 are formed in a slant direction to the screen surface. Infrared rays IR are reflected on inner surfaces of the through holes to travel from one side of the screen to other side. In this case, it is preferable to provide reflection surfaces 17 on the inner surfaces of the through holes 16.

Several embodiments of the present invention have been described in detail but these embodiments are simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A screen device comprising:
    a screen unit on which an image is projected; and
    an infrared ray transmitting unit provided in the vicinity of said screen unit, for allowing infrared rays to pass therethrough, and for preventing visible rays from passing therethrough.

2. The screen device according to claim 1, wherein said screen unit comprises a reflection type screen for reflecting visible rays.

3. The screen device according to claim 1, wherein said screen unit comprises a transmission type screen for allowing visible rays to transmit therethrough.

4. The screen device according to claim 3, wherein said screen unit comprises a transmission type screen for allowing visible rays and infrared rays to transmit therethrough.

5. The screen device according to claim 1, wherein said infrared ray transmitting unit guides infrared rays from one side of the screen unit to another side of the screen unit.

6. The screen device according to claim 1, wherein said infrared ray transmitting unit allows infrared rays having wavelengths of longer than approximately 800 nanometers to pass therethrough.

7. A screen device comprising:

a screen unit on which an image is projected; and a light guiding member provided in the vicinity of said screen unit, for guiding infrared rays from one side of said screen unit to another side of the screen unit; and wherein said light guiding member comprises a light reflection material which is provided so as to surround said screen unit.

8. A screen device comprising:

a screen unit on which an image is projected; and a light guiding member provided in the vicinity of said screen unit, for guiding infrared rays from one side of said screen unit to another side of the screen unit; and wherein said light guiding member comprises a flat member having through holes of small diameters formed therein.

9. The screen device according to claim 8, wherein an inner surface of the through holes formed in the member of said light guiding member is provided with a reflection layer.

10. A screen device comprising:

a screen unit on which an image is projected; and a light guiding member provided in the vicinity of said screen unit, for guiding infrared rays from one side of said screen unit to another side of the screen unit; and wherein said light guiding member comprises a member that is formed with through holes passing through slantwise from one surface of the member to another surface of the member.

11. An image projecting system comprising:

a screen device installed in front of a viewer, and onto which an image is projected;

an image projecting apparatus for projecting an image onto said screen device;

a video tape recorder apparatus provided with an infrared ray receiving unit and installed at a rear side of the screen device as viewed by the viewer;

an infrared ray remote controller adapted to be manipulated by the viewer; and a light guiding section provided in the vicinity of said screen device, for guiding infrared rays emitted from said infrared ray remote controller from the side of the viewer to the rear side of the screen device.

12. The image projecting system according to claim 11, wherein said light guiding section comprises a light reflecting material.

13. A screen device comprising:

a screen unit on which an image is projected;

a light shielding unit provided beneath said screen unit and having through holes of small diameters formed in said light shielding unit; and a frame member for supporting said screen unit and said light shielding unit; and wherein said light shielding unit comprises a flat member formed with said through holes passing through slantwise from one surface of the member to another surface of the member.

14. A screen device comprising:

a screen unit on which an image is projected;

a light shielding unit provided beneath said screen unit and having through holes of small diameters formed in said light shielding unit; and a frame member for supporting said screen unit and said light shielding unit; and wherein an inner surface of the through holes formed in said light shielding unit is provided with a reflection layer.

* * * * *